Sept. 25, 1956 E. HAECKER 2,764,315
LIQUID COUNTER
Filed Dec. 3, 1952
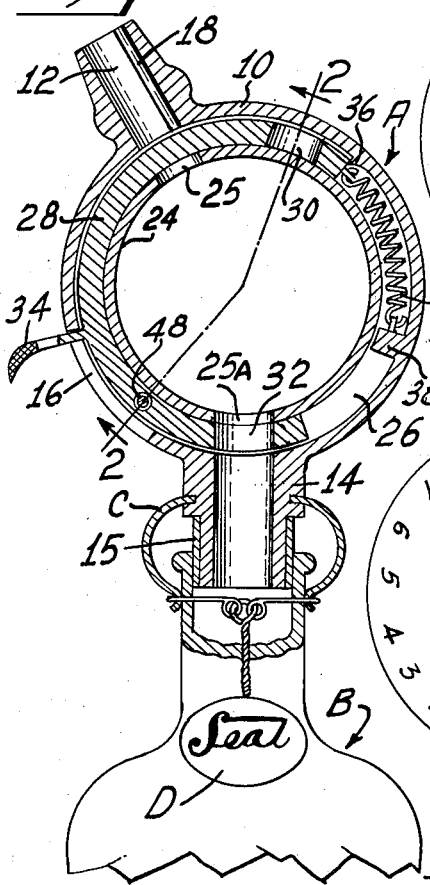
Fig_1
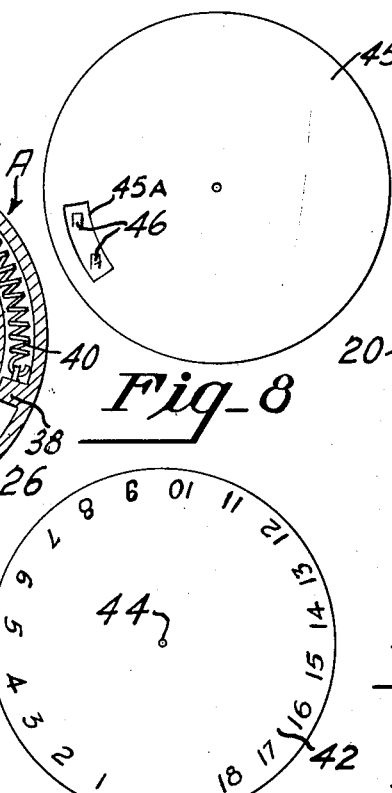
Fig_8
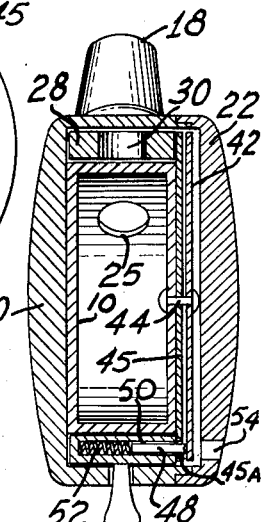
Fig_2
Fig_3
Fig_4
Fig_6
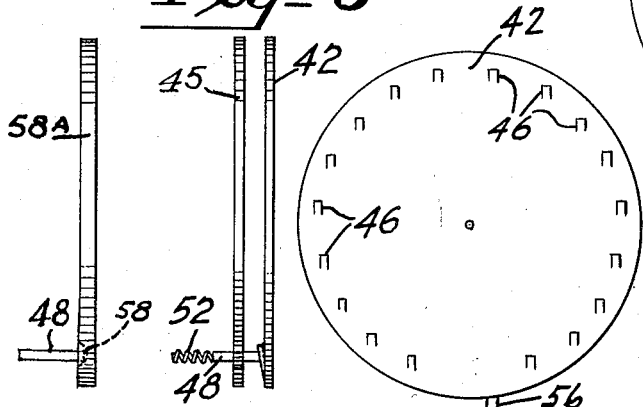
Fig_7  Fig_5
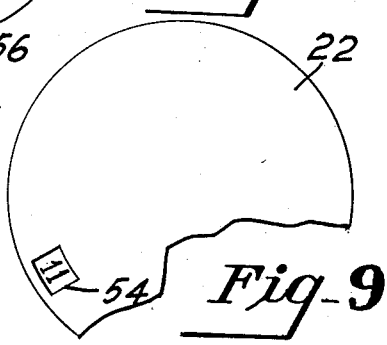
Fig_9
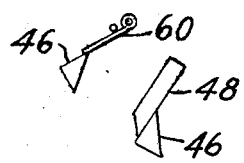
INVENTOR.
Ernest Haecker
BY Harry Langsam
ATTORNEY

United States Patent Office 2,764,315
Patented Sept. 25, 1956

2,764,315

LIQUID COUNTER

Ernest Haecker, Philadelphia, Pa.

Application December 3, 1952, Serial No. 323,858

2 Claims. (Cl. 222—38)

This invention relates to a dispensing device for use with containers or the like and particularly relates to a dispensing device wherein there is provided a means to measure the amount of material withdrawn from the container.

It is often necessary to accurately measure off the exact amount of a fluid or a powder needed for a certain recipe or formula. Also, in the case of selling liquor at a bar, it is necessary to accurately measure off a jigger, glass-full, or other amounts by which the price of the drink is measured. It is also, important to know how much of the liquid has been used up and how much is left in the bottle. This determines when a new bottle is to be bought or opened. Furthermore, in order to prevent emptying of the bottle having a brand name thereon and placing inferior contents therein; it has been found necessary to provide a device which prevents insertion of the other liquid contents but allows the original contents to be withdrawn.

The present invention not only is adapted to measure off an exact quantity of liquid but is also capable of counting the amount of liquid dispensed or left in the bottle. It is, furthermore, sealed to the bottle to prevent its removal and the filling of the bottle with inferior substances.

One object of my invention, therefore, is to provide a dispensing means capable of metering off an exact quantity of the contents of a container at each activation.

Another object of my invention is to provide a dispensing device which accurately and automatically measures the amount of contents dispensed.

Another object of my invention is to provide a dispensing and measuring device which may be sealed to the container and the measuring means of which cannot be re-set until the dispenser is removed from the bottle.

Other objects of my invention are to provide an improved device of the character described that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 1 is a sectional view of a dispenser embodying my invention shown attached to a liquor bottle.

Fig. 2 is a view taken on line 2—2 of Fig. 1.

Fig. 3 is an elevational view of the front of the indicator housing.

Fig. 4 is a front elevational view of the dial.

Fig. 5 is a rear elevational view of the dial.

Fig. 6 is a side elevational view of the dial.

Fig. 7 is a side elevational view of a modified form of the indicator dial.

Fig. 8 is a front elevational view of the inner disc.

Fig. 9 is a schematic view showing the operation of the retainer spring.

Referring now in greater detail to the drawing where- in similar reference characters refer to similar parts, I show a dispensing unit A sealingly attached to a liquor bottle B by means of a wire C sealed to the bottle by seal D.

The dispensing unit A comprises an outer cylindrical housing 10 which is provided with a nozzle 12 and a tubular insert 14 circumferentially spaced from the spout by approximately 180 degrees and extending through a stopper 15. A slot 16 is provided intermediate the nozzle 12 and insert 14 for a purpose to be described. Adjacent the spout 12 is provided a vent port 18 to admit air during pouring so as to prevent bubbling. A molded cover 20 is provided at one side of the housing 10 and a molded cover 22 is provided at the other side thereof, one interfitting into the other.

Within the housing 10 is provided a cylindrical wall 24 spaced from the housing wall to define an annular channel 26 therebetween. Circumferentially spaced openings 25 and 25A are formed in the wall 24, one of these openings corresponding to the opening in the spout 12 and the other of the openings corresponding to the opening in the tubular insert member 14. A curved rotary valve 28 is positioned in the channel 26, this value 28 extending only a little more than 180 degrees. Oppositely disposed openings 30 and 32 are provided in the valve 28, these openings being so disposed that when the opening 30 coincides with spout 12 and opening 25, opening 32 is out of line with the opening in tubular insert 14 and with opening 25A. On the other hand, when opening 32 coincides with the opening in insert 14 and with opening 25A the opening 30 is out of line with spout 12 and with opening 25. An actuating handle 34 is provided on valve 28 and this handle extends through the slot 16, the length of the slot limiting the movement of the handle and therefore, of the valve 28. Additional means to limit the rotary movement of the valve 28 are provided by lugs 36 and 38 formed on the interior of the housing 10. The stop 36 limits the movement of the rotary valve 28 in one direction and the stop 38 limits it in the other direction. A spring 40 is connected between one end of the rotary valve 28 and the lug 38. This spring acts to bias the valve 28 clockwise as viewed in Fig. 1, this biasing movement acting to hold the opening 30 out of line with the spout and the opening 32 in the line with the tubular insert.

When it is desired to pour the liquor, the bottle is turned to pouring position and liquid flows through the opening in insert 14 into the dispensing unit. The full amount that the dispensing unit will hold may equal one jigger, or one ounce, or any other measure desired. The handle 34 is then pressed down moving the valve 28 to close the opening in the insert and open the spout. The liquid is then dispensed. When the liquid has been dispensed, the handle is released and the spring 40 acts to close the spout and open the insert.

In order to know how many measures have been dispensed and how much is left in the bottle, a counting device is provided. As each measure is dispensed, this counter registers the total amount of measure that have been dispensed. This counting device comprises a rotary disc or dial 42 mounted for rotation on a rivet 44 which is, in turn, connected to one of the outer walls of housing 10. Connected to the housing 10 adjacent the disc 42 but spaced therefrom is a stationary disc 45, the river 44 extending through this disc. A slot 45A is provided in the disc 45. The disc 42 is provided on one face with a series of numbers adjacent the periphery. There are here shown 18 numerals although the number may vary. Corresponding to each of the numerals on the front face of the dial there is provided a detent 46 struck from the rear face thereof. These detents are adapted to coact with a lug 48 which is slidably positioned in a recess 50 formed in the housing 10.

The lug 48 is biased outwardly of the recess 50 by a spring 52. The disc 45 normally prevents the lug 48 from leaving the recess 50 under pressure of the spring 52. However, when the rotary member 28 is turned, by means of handle 34, to a position wherein the slot 45A coincides with the recess 50, the lug 48 is forced out through the slot where it is in a position to abut against one of the detents 46. As the rotary valve 28 continues to turn, the lug carries the disc 42 around with it until the lug passes beyond the slot 45A, after which it is forced to recede back into the recess 50 by the camming action of the disc 45. The dial 42 has, in this way, been turned so that the next succeeding number appears in the window 54 formed in the casing portion 22. As the lug 48 carries one of the lugs 46 around, a spring arm 60 connected to the disc 45 abuts against the next succeeding lug 46. The purpose of this spring arm is to prevent the frictional contact between the lug 48 and the face of the dial 42, caused by the pressure of spring 52, from creating a force moving the dial backwards or clockwise, as viewed in Fig. 1, as the lug 48 is brought back to engage the next succeeding lug, as is illustrated in Fig. 9, the lug 48 has a cam face which allows it to slide back over a corresponding cam face on the lugs 46. As the lug 48 is moved backwards over the cam face of the next succeeding lug 46, it pushes the spring arm 60 out of the way so that it may, itself, abut against the straight edge of the next succeeding lug 46 in position for the next actuation of the unit.

It is to be noted that an extra wide space is provided between the numerals 1 and 18 and between the two detents corresponding to these numerals. This is because a numeral and a detent is deleted at this point. The reason for this is that after 18 measures have been used up, the bottle is empty and if the indication were allowed to function upon continued actuation of the handle, there would be an indication that only one shot had been used up whereas the whole bottle is empty. Therefore, by providing an empty space after 18, if the handle is again actuated, the lug 48 will not impinge on a detent 46 and the dial will not be turned.

In order to reset the dial, it is necessary to break the seal and remove the dispensing unit from the bottle. An off-set handle 56 is formed on the dial between 18 and 1 and when the dispensing unit is removed, this handle which then extends into the opening in the insert 14, can be moved to move the dial around until the numeral 1 is in position. The unit is then ready to be sealingly applied to a new bottle. The handle 56 may, if desired, be done away with entirely, and the dial may be manually turned by removing the portion 22 and rotating the dial with the hand.

In Fig. 7 is illustrated a modification of the dial wherein instead of detents, notches 58 are formed on the rear face of the dial 58A. The operation of this dial is the same as that of the dial 42, however.

Although my invention has been described in considerable detail, such description is intended as being illustrative rather than limiting, since the invention may be variously embodied, and the scope of the invention is to be determined as claimed.

I claim as my invention:

1. A dispensing device which measures for attachment to a container comprising a cylindrical housing having one opening adapted to coincide with an opening in said container and a second opening circumferentially spaced from said first opening to serve as an outlet, rotatable means within said housing for metering off measures of the contents of said container, indicating means connected to and actuated by said rotatable means to indicate the number of measures dispensed, said rotatable means being a curved valve having circumferentially spaced openings, one of which is adapted to coincide with said first opening in said housing when second opening is covered and the other of which is adapted to coincide with said second opening in said housing when said first opening is covered, a handle connected to said valve and adapted to extend through a slot in said housing so as to be accessible for being actuated to rotate said valve, and a spring connected at one end to said housing and at its other end to said valve and being adapted to bias said valve toward a position wherein said first opening in said housing is uncovered and wherein said second opening is covered, said handle also being adapted to actuate said indicating means, and means whereby said indicating means will not indicate any further after the contents of the bottle is dispensed.

2. The invention of claim 1 including an insert having an opening on said dispenser, an offset handle on said dial between 18 and 1 and extending into the inlet insert opening of the dispensing device, and when the dispensing device is removed this handle cannot move said dial until the numeral 1 is in position.

References Cited in the file of this patent

UNITED STATES PATENTS

| | | |
|---|---|---|
| 845,531 | Davidson | Feb. 26, 1907 |
| 2,209,766 | Dale et al. | July 30, 1940 |
| 2,363,747 | Reece et al. | Nov. 28, 1944 |
| 2,573,462 | Wortmann | June 14, 1949 |